May 12, 1964 R. B. DOWNEY 3,132,572
PHOTOGRAPHIC PROCESSING APPARATUS
Filed June 18, 1962 4 Sheets-Sheet 1

INVENTOR.
Rogers B. Downey
BY Brown and Mikulka
and
Robert E. Cork
ATTORNEYS

May 12, 1964  R. B. DOWNEY  3,132,572
PHOTOGRAPHIC PROCESSING APPARATUS
Filed June 18, 1962  4 Sheets-Sheet 2

INVENTOR.
Rogers B. Downey
BY Brown and Mikulka
and
Robert E. Corb
ATTORNEYS

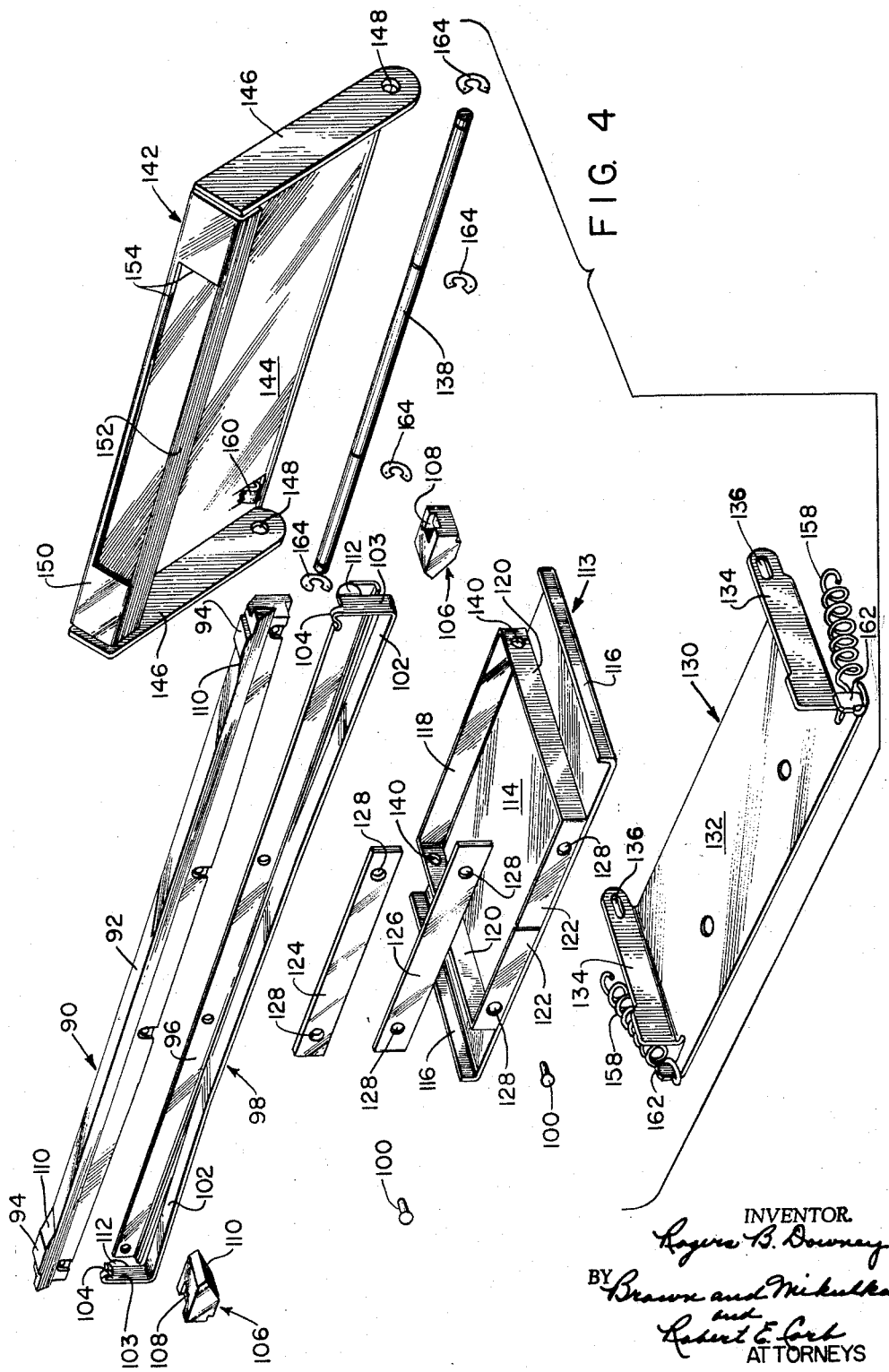

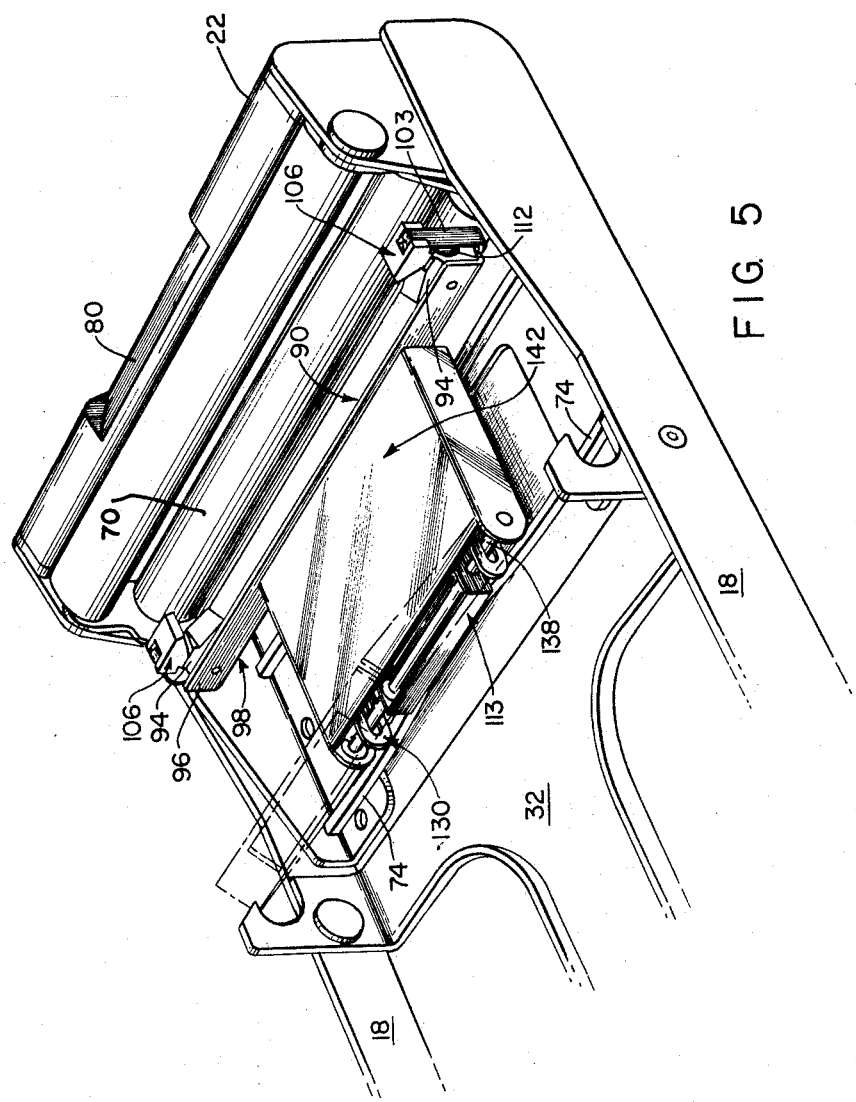

United States Patent Office 3,132,572
Patented May 12, 1964

3,132,572
PHOTOGRAPHIC PROCESSING APPARATUS
Rogers B. Downey, Lexington, Mass., assignor to Polaroid Corporation, Cambridge, Mass., a corporation of Delaware
Filed June 18, 1962, Ser. No. 203,265
15 Claims. (Cl. 95—13)

This invention relates to photographic processing apparatus and particularly to apparatus for distributing a processing liquid between a pair of superposed sheets.

An object of the invention is to provide, in photographic apparatus including a pair of juxtaposed members for distributing a processing liquid between a pair of superposed sheets as the sheets are moved relative to and between the members, novel and improved means for preventing the escape of the processing liquid from between the sheets at the lateral edges thereof.

The photographic apparatus in which the invention is incorporated is designed for use with a film unit comprising a first sheet which is moved toward and between the fluid-distributing members while another sheet located in contact with the first sheet is required to remain stationary during a portion of the movement of the first sheet, and then move together with the first sheet between the fluid-distributing members.

Another object of the invention is to provide photographic apparatus of the type described in which the means for preventing escape of the processing liquid from between the lateral edges of the sheets is also designed for restraining a sheet against movement until movement of that sheet is required and then permitting movement of the sheet.

Further objects of the invention are: to provide means of the foregoing type movable between an operative position closely adjacent the juxtaposed, liquid-distributing members and an inoperative position at which said means are displaced from the fluid-distributing members to permit access to the latter; and to provide means of the type described so mounted as to properly locate itself with respect to the sheets during movement of the sheets between the liquid-distributing members.

Other objects of the invention will in part be obvious and will in part appear hereinafter.

The invention accordingly comprises the apparatus possessing the construction, combination of elements and arrangements of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is an exploded perspective view of components of the apparatus of FIGURE 1; and FIG. 5 is a fragmentary perspective view of a portion of the apparatus of FIGURE 1.

Figure 1:
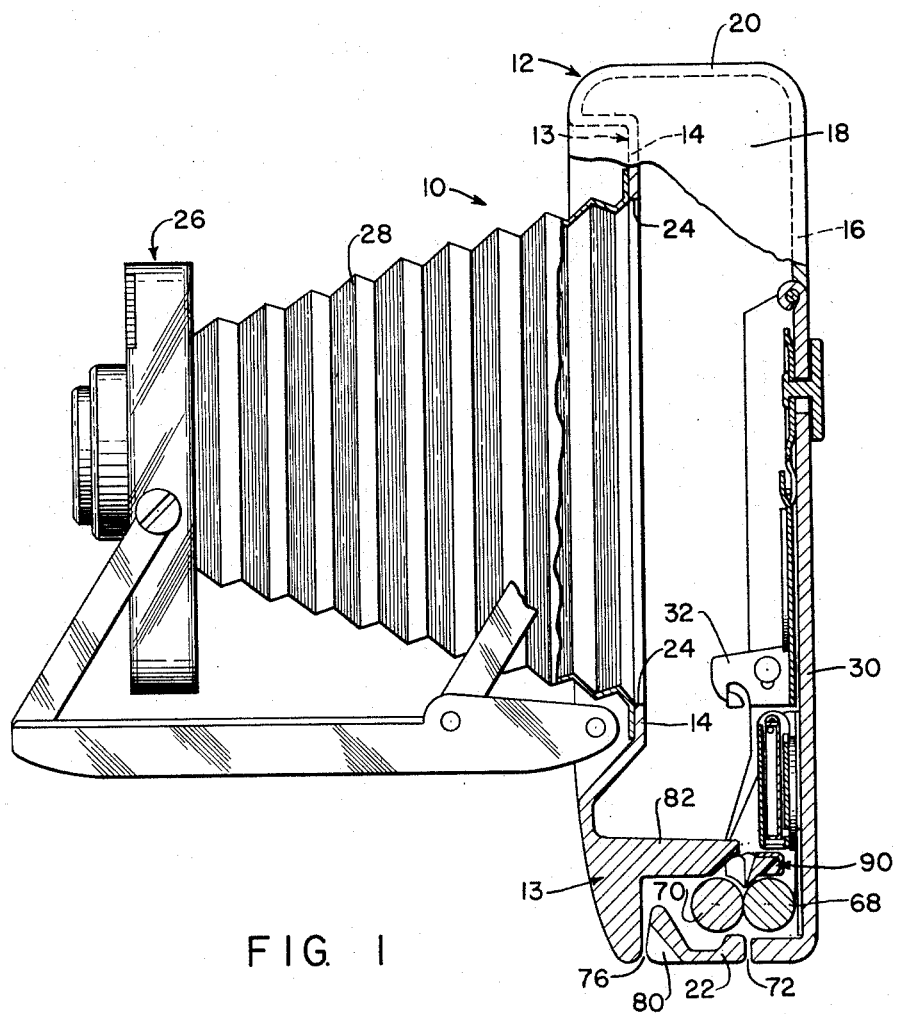
FIGURE 1 is an elevational view, partially in section taken midway between the sides, of photographic apparatus embodying the invention.

The present invention is incorporated in photographic apparatus in the form of a camera, designated 10 in FIGURE 1, and comprising a housing 12 including a forward wall 13 provided with a recessed or re-entrant section 14, a rear wall 16, side walls 18 and end walls 20 and 22. The re-entrant section 14 of the forward wall is provided with a rectangular exposure opening 24 for admitting light to the housing from a conventional lens and shutter assembly 26 connected to re-entrant section 14 by a collapsible bellows 28 coupled to the lens and shutter assembly and to re-entrant section 14 around the periphery of exposure opening 24. The forward, rear, side and end walls of the housing cooperate to provide a chamber in which an assemblage of film units are positioned for exposure and in which processing of the film units is accomplished. To permit loading of an assembly of film units into the housing, a section of rear wall 16 comprising approximately two-thirds of the rear wall is pivotally connected to the rear wall to form a door 30, and end wall 22 is also mounted on door 30 for movement together with the door relative to the remainder of the housing. A latch device 32, operable from the exterior of the housing, is provided for retaining door 30 in the closed position shown.

Figure 2:
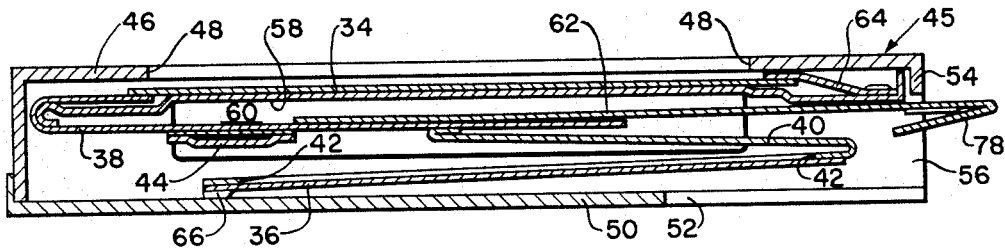
FIG. 2 is a sectional view taken substantially midway between the sides of a film assemblage adapted to be employed in the apparatus of FIGURE 1.

Camera 10 is designed for exposing and processing photographic film units of the type shown and described in U.S. Patent No. 2,991,702, issued July 11, 1961, in the name of Vaito K. Eloranta. Film units of this type generally comprise a photosensitive image-recording sheet, a second or print-receiving sheet and a container of a processing liquid which is distributed between the two sheets following exposure of the photosensitive sheet for the purpose, for example, of producing a photosensitive print in the second sheet by a silver halide diffusion-transfer reversal process. The film unit is usually supplied together with one or more similar film units in a container in the form of a film pack which may be loaded into the camera of the invention and be employed to produce a sequence of photographic prints. A single film unit is shown in a container in FIG. 2 of the drawings and comprises a generally rectangular photosensitive sheet 34 and a similar second sheet 36, which are superposed during the processing of the film unit. The photosensitive sheet is connected at its leading end to a leader sheet 38 which tapers (in a manner not shown) toward its leading end. Second sheet 36 is mounted on a carrier sheet 40 also tapering toward its leading end and provided with an opening or aperture 42 overlying second sheet 36 and having a shape corresponding approximately to exposure opening 24 and re-entrant section 14. The leading end of carrier sheet 40 is attached to leader sheet 38 at a position spaced from the leading end of the leader sheet toward the opposite end thereof so that the photosensitive and second sheets are registered with one another when the leader sheet and the carrier sheet are superposed. Mounted on leader sheet 38 between the leading end of carrier sheet 40 and the leading end of photosensitive sheet 34 is a rupturable container 44 of the type disclosed in U.S. Patent No. 2,543,181, issued February 27, 1951, in the name of Edwin H. Land. Container 44 is filled with the processing liquid which is to be distributed between the photosensitive and second sheet and is designed to release its liquid contents for distribution when subjected to compressive pressure.

The film unit is enclosed in a container of the type disclosed in the aforementioned Patent No. 2,991,702, designed to hold a plurality of film units, maintain the film units in a light-free environment and permit exposure and withdrawal or successive film units. The container, designated 45, comprises a forward wall 46 having an exposure aperture 48 corresponding to exposure opening 24, a rear wall 50 having a medial opening 52 extending inwardly from the leading end of container 45 toward the opposite end thereof, and a leading end wall extending rearwardly from forward wall 46 and providing a withdrawal opening 56 at the leading end of the container through which film units within the container can move.

A pressure plate 58 is provided within container 45 underlying exposure aperture 48 for supporting photosensitive sheet 34 in position for exposure against forward wall 46 across the exposure aperture. Pressure plate 58 includes dependent flanges 60 at its edges extending toward rear wall 50, and the latter is provided with springs (not shown) for urging the pressure plate toward forward wall 46. The film unit is positioned within container 45 with photosensitive sheet 34 disposed between the pressure plate and forward wall 46. Leader sheet 38 extends around the trailing end of the pressure plate and between the leader and rear wall 50 to a position intermediate the ends of the assemblage with container 44 disposed on the surface of leader 38 facing the rear of the assemblage. Carrier sheet 40 extends from its point of attachment to leader sheet 38 toward opening 56 where the carrier sheet is bent back upon itself so that second sheet 36 is disposed between the carrier sheet and rear wall 50 adjacent the latter.

In the processing of the film unit following the exposure of the photosensitive sheet, the leading end of leader sheet 38 is drawn through container 45 of the film assemblage toward opening 56 thereby drawing photosensitive sheet 34 around and behind the pressure plate into superposition with second sheet 36 which is held stationary during movement of the photosensitive sheet from exposure position. As a means for withdrawing leader sheet 38 from container 45 through opening 56, there is provided an elongated leader 62 which is substantially narrower than the sheets comprising the film unit and has a substantially uniform width throughout at least the major portion of its length. Leader 62 is secured to leader sheet 38 at a position spaced from the leading edge of sheet 38 toward the opposite end thereof and located, as shown, between the point of attachment of leader sheet 38 and carrier sheet 40 and container 44. The film assemblage shown in FIG. 2 preferably comprises a plurality of film units positioned within container 45 in the manner shown and described with the photosensitive sheets arranged in stacked relation between the pressure plate and forward wall 46 and the leader sheets, carrier sheets and second sheets arranged in stacked relation behind the pressure plate between the latter and rear wall 50. The forwardmost (outermost) photosensitive sheet and the rearmost (outermost) second sheet comprise the same film unit, and it is this film unit which is exposed and then withdrawn from the container for processing. Movement of the photosensitive sheet 34 underlying the exposed photosensitive sheet, as the latter is withdrawn from between pressure plate 58 and forward wall 46, is prevented by a trailer sheet 64 provided on the trailing end of each photosensitive sheet 34 and secured to the pressure plate, for example, by stapling at the corners of trailer sheet 64. The corners of each trailer sheet may be pre-cut in such a way as to facilitate tearing of the trailer sheet to permit its withdrawal movement as described; yet, the trailer sheet is of sufficient strength to resist movement of the photosensitive sheet due to frictional forces between the photosensitive sheets.

Processing of a film unit is accomplished by distributing the liquid contents of container 44 between and in contact with photosensitive sheet 34 and second sheet 36 by advancing the container and sheets in superposition, between a pair of juxtaposed pressure-applying members. The processing liquid may be provided in container 44 in an amount which is more than that required to effect the treatment of the exposed area of the photosensitive sheet; and accordingly means are provided for trapping any excess processing liquid as it is being distributed between the sheets to prevent the liquid from escaping at the trailing edges of the photosensitive and second sheets. These means, in the form shown, comprise a pair of trapping members 66 secured to the rear surface of second sheet 36 at the lateral edges and trailing end thereof. These trapping members function to space the pressure-applying members apart as the trapping members move therebetween and thereby provide a gap between trailer sheet 64 and the trailing end portion of carrier sheet 40 in which excess processing liquid is trapped and retained.

Figure 3:
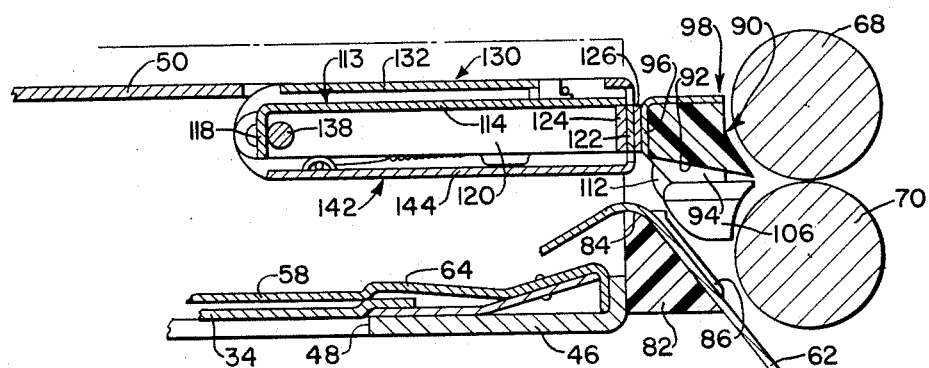
FIG. 3 is an enlarged sectional view, similar to FIGURE 1, of a portion of the apparatus of FIGURE 1 shown with a film assemblage in position to illustrate the operation of the apparatus.

The pressure-applying members which distribute the processing liquid are shown in FIGS. 1, 3 and 5 of the drawings as comprising a pair of cylindrical rolls 68 and 70 mounted in juxtaposition with their axes in a plane substantially perpendicular to the direction of movement of the sheets and the plane of movement of the sheets between the rolls. Both of rolls 68 and 70 are mounted on door 30 adjacent end wall 22, and the latter is provided with a narrow withdrawal slot 72 aligned with the bite of the two rolls and permitting withdrawal movement of film units between the rolls and from the camera housing.

Roll 70 is preferably mounted for limited movement in the plane of the axes of the rolls toward and away from roll 68 and is biased toward roll 68 by a pair of U-shaped springs 74. Provision may be made for mounting roll 70 in such a way as to permit the roll to be moved away from roll 68 to facilitate access to the rolls for the purposes of cleaning the rolls.

Each film unit, following exposure, is withdrawn from the film assemblage container 45 and from the camera housing between rolls 68 and 70 in two steps. During the first step, the leading end of leader sheet 38 is advanced between the pressure-applying rolls through slot 72 to an extent which permits the leading end of leader sheet 38 to be grasped manually and then withdrawn, (second step), for advancing the photosensitive and second sheets between the pressure-applying rolls. Advancement of the leading end of leader sheet 38 between the rolls and through slot 72 is effected by withdrawal of leader 62 from the camera housing to one side (forwardly) of both of the rolls. To permit withdrawal of leader 62, the camera is provided with a passage 76 between the forward wall of the camera housing and end wall 22. The film assemblage is provided with the leading ends of leaders 62 projecting from the film assemblage through opening 56, and the assemblage is loaded into the camera housing through the opening provided by door 30 and positioned within the housing with forward wall 46 located against re-entrant section 14 of forward wall 13 and openings 24 and 48 in the two forward walls in alignment. The leading end sections, designated 78, of leaders 62 extend from the assemblage and are automatically located forwardly of roll 70 within passage 76 between forward wall 13 and end wall 22 when door 30 is pivoted to the closed position shown. Leading end sections 78 are folded upon themselves, and end wall 22 is provided with a recess 80 adjacent passage 76 for accommodating the folded leading end sections 78 of leaders 62. Each of the folded leading end sections is secured to the leading end section of the leader of the film unit to be withdrawn previously so that the leading end section of each film unit is unfolded so as to project from the camera at passage 76 by withdrawal of the previous film unit; and, by virtue of this arrangement, only one leader at a time extends from the camera housing. The film assemblage is initially provided with a cover sheet which extends across aperture 48 between forward wall 46 and the foremost photosensitive sheet 34 and around and behind the pressure plate and through opening 56. This cover sheet (not shown) includes a leader which projects through and beyond passage 76, and the leading folded end section 78 of the first film unit is attached to the leader of the cover sheet which is adapted to be withdrawn first from the camera housing and from the assemblage to permit exposure of the photosensitive sheet of the first film unit.

As leader 62 is withdrawn from the camera through passage 76, the leading end of leader sheet 38 is guided between rolls 68 and 70 through slot 72. Withdrawal movement of leader 62 is continued and results in separation of leader 62 from sheet 38 after a length of sheet 38 has been advanced from slot 72 sufficient to permit the sheet to be grasped manually for withdrawing the film unit, of which it is a part, from the camera. The camera includes means for guiding the leading end of sheet 38 between the pressure-applying rolls and insuring the separation of leader 62 from sheet 38. This means is of the type shown and described in detail in U.S. patent application Serial No. 112,941, filed May 21, 1961, in the name of Joel A. Hamilton; and in the form shown in the drawings, comprises a guide member 82 mounted on forward wall 13 and extending rearwardly adjacent roll 70. Guide member 82 includes a rear surface 84 disposed at or adjacent the plane of movement of the film units through opening 56 and into the bite of rolls 68 and 70. Member 82 also includes an inclined surface extending from adjacent the path of the film units toward passage 76, and this inclined surface is provided with a recessed section or channel 86, approximately equal in width to the width of leader 62 and substantially narrower than the leading end portion of leader sheet 38. Member 82 is so positioned that a leader 62 being withdrawn from the camera through passage 76 moves within channel 86 while leader sheet 38, being too wide to pass through the channel, cannot follow leader 62 and is guided by rear surface 84 toward the bite of the rolls. If withdrawal movement of leader 62 is continued, the leader and sheet 38 are advanced along convergent paths until the point of attachment of leader 62 and sheet 38 reaches rear surface 84 of member 82 whereupon the leader and sheet 38 become separated. Member 82 also serves to facilitate the separation of leader 62 from sheet 38 since the sheet is unable to follow the leader within channel 86, and the edges of the channel at rear surface 84 facilitate separation of the leader from sheet 38.

As leader sheet 38 is being withdrawn into the bite of the pressure-applying rolls and later, as movement of photosensitive sheet 34 into superposition with second sheet 36 within the film assemblage is continued, frictional forces between the various sheets tend to cause second sheet 36 and the portion of carrier sheet 40, to which the second sheet is attached, to move in the direction of movement of the other sheets from the container of the assemblage through opening 56. In accordance with the invention, the camera includes means for restraining the second sheet against movement toward the pressure-applying rolls until the photosensitive sheet is in superposition with the second sheet in readiness for the two sheets to be drawn together between the pressure-applying rolls by leader sheet 38 and carrier sheet 40. This function of restraining the second sheet against movement is performed by means provided in the camera for engaging the lateral margins of the sheets and preventing the processing liquid from escaping at the edges of the sheets as the processing liquid is being distributed between the sheets during movement of the sheets between the pressure-applying rolls. The means for restraining the second sheet against movement and preventing escape of the processing liquid from between the lateral edges of the sheets comprise means for compressing the superposed photosensitive and second sheets at their lateral margins adjacent the pressure-applying roll as the sheets move between the rolls.

In the form shown, these means comprise an elongated pressure member 90 having a length at least equal to the length of the sheet engagement portions of rolls 68 and 70. Member 90 is intended to be positioned closely adjacent roll 68 and has a cross section such that the surface of member 90 facing roll 68 conforms at least approximately to the curvature of roll 68 so that a portion of member 90 may extend into the bite of the rolls. Member 90 includes an intermediate section having a forward surface 92 for guiding leader sheet 38 toward the bite of the rolls and end sections 94 having surfaces extending forwardly beyond surface 92 and disposed substantially parallel with the plane of movement of the sheets of the film unit toward and through pressure-applying rolls. Member 90 is mounted on one side 96 of a support member 98 having a generally L-shaped cross section by suitable means such as rivets 100 which also serve to secure support member 98 to mounting means which will be described hereinafter. Support member 98 is preferably formed of a resilient sheet metal and includes another side substantially perpendicular to side 96 and including end sections 102 separated from side 96, deformed away from pressure member 90 and comprising cantilever springs. The end portions 103 of end sections 102 are turned up and extend forwardly beyond the ends of pressure member 90 and are then turned inwardly toward one another and provided with S-shaped bends to form tabs 104. A pair of pressure members 106 are provided, including recesses 108 in which tabs 104 are engaged. Pressure members 106, in the form shown, are mounted on the ends of end sections 102 between tabs 104 and end sections 94 of pressure member 90 and are urged toward and into juxtaposition with end sections 94 by end sections 102 of support member 98. Pressure members 106 include rear facing surfaces conforming substantially to the forward facing surfaces of end sections 94 for engaging the margins of the sheets and cooperating with sections 94 to apply compressive pressure to the sheets. Pressure members 106 also include rearwardly facing surfaces 110 extending from the pressure surfaces thereof toward one another and inclined toward the front of the camera. End sections 94 of member 90 are provided with similarly inclined surfaces, also designated 110, and these surfaces cooperate to guide leader sheet 38 which, as previously noted, is tapered towards its ends, between the pairs of pressure-applying members.

Pressure members 106 are also shaped so that the surfaces thereof which face roll 70 conform to the curvature of the roll so that members 106 extend together with member 90 into the bite of rolls 68 and 70. In an alternative embodiment, members 106 may comprise the end sections of a single elongated pressure member similar in many respects to member 90. In this embodiment, the intermediate portion of the member would be recessed as is the intermediate portion of member 90 so that a film unit can pass between the two members without compressive pressure being applied to container 44. The spacing between turned up end portions 103 is approximately equal to the widths of sheets 34 and 36 so that the sheets will pass therebetween.

The pressure-applying members in their operative position are mounted closely adjacent rolls 68 and 70 and extend into the bite of the rolls in position to engage and compress the margins of the film units as the film units are moved between the rolls from the film assemblage. The spring force biasing members 106 toward end sections 94 of member 90 are sufficient to prevent movement of the leading end of sheet 36 between the members in response to the forces resulting from frictional engagement of sheet 36 and carrier sheet 40 with other sheets of the film unit. Thus, as leader 62 is being withdrawn and sheet 36 and the portion of the carrier sheet to which it is secured move toward the pressure-applying members, this movement is limited by pressure members 90 and 106 since the frictional forces exerting on sheets 36 and 40 are insufficient to force the leading ends of the sheets between the pressure-applying members. However, the leading end of carrier sheet 40, being tapered, is drawn between members 106 and in turn, between member 106 and member 90; and, as this sheet becomes fully extended, the tension applied thereby to sheet 36 is sufficient to cause sheet 36 to move between member 90 and members 106.

End portions 103 are provided with small, oppositely curved ears 112 which engage the lateral edges of the film units and guide the film units between end portions 103. In accordance with the invention, the pressure members 90 and 106 are mounted for movement transversely of the direction of movement of the film units between rolls 68 and 70; and while the pressure members are preferably located in a position at which end portions 103 are located equidistant from the center of the path of movement of the sheets (and centers of rolls 68 and 70), the means for locating the pressure members are preferably resilient and permit movement of the pressure members so that end sections 94 and members 106 engage the lateral margins of the sheets regardless of displacement of the path of movement of the sheets or changes in the direction of movement in the sheets. The means for compliantly mounting pressure members 90 and 106 also permit limited movement of the pressure-applying members in a direction perpendicular to the plane of the sheets, i.e., parallel with a plane through the axes of the rolls thereby helping to insure proper location of the pressure members with respect to the bite of the rolls and the plane of movement of the sheets between the pressure-applying members. In the form shown, the last-mentioned means comprise a generally rectangular plate 114 having dependent flanges at opposite ends and an integral dependent flange 118 along one side located intermediate the ends of plate 114 but not extending to the ends thereof. Flange 118 includes extending sections at its ends unconnected with plate 114 and including first sections 120 extending perpendicularly to flange 118 and parallel with flanges 116 and second sections 122 extending toward one another parallel with flange 118 and butted against one another at their ends. Flange 118 and plate 114 as well as first and second sections 120 and 122 are formed of a single sheet of resilient material such as metal. A pair of plates 124 and 126 are provided for clamping sections 122 in end to end, butted relation between the plates; and the plates and sections 122 are provided with aligned holes 128 for receiving rivets 100 which serve, not only to fasten member 90 to side 96 of forward member 98, but also to clamp second sections 122 between plates 124 and 126 and fasten the end sections and plates to side 96 of member 98.

A supporting chassis 130 including a base plate 132 and two flanges 134 at its ends is provided mounted on door 30 for mounting the means on which members 90 and 106 are mounted. Each of flanges 134 includes a slot 136 for receiving an elongated pivot pin 138. First sections 120 are provided with holes 140 located adjacent flange 118, and are mounted for pivotal movement on pin 138 which extends through holes 140, with plate 114 disposed in face-to-face relation with base plate 132 and flange 118, and first and second sections 120 and 122 located at the side of plate 114 opposite base plate 132.

A cover member 142 is provided mounted for pivotal movement on pin 138 and including a generally rectangular cover plate 144 having a length exceeding the length of base plate 132 which in turn exceeds the length of plate 114. Cover member 142 includes flanges 146, at the ends of cover plate 144, each provided with a hole 148 adjacent one transverse edge for pivotally mounting cover member 142 on pin 138 and a flange 150 extending from end to end of cover plate 144 along the edge thereof opposite holes 148 and including a dependent edge section 152 bent at a right angle to flange 150 and extending toward the opposite edge of cover plate 144. Cover member 142 is mounted on pin 138 wtih flanges 146 and 150 extending toward the rear of the camera outside of flanges 134, and cover plate 114 cooperates with plate 144 to confine and protect support member 113, flange 118 and first and second sections 120 and 122 thereof. An opening 154 is provided in flange 150 to permit second sections 122 and the end portions of first sections 120 on which the second sections are mounted to project from the chamber defined by plate 114, cover plate 144 and flanges 146 and 150. Opening 154 is of a length which permits first and second sections 120 and 122 to move transversely of the direction of movement of film units within the space between plate 114 and 144. This lateral movement is achieved by virtue of the resiliency of flange 118 and first and second sections 120 and 122, and is limited by the size of opening 154 in flange 150. Flange 118, first sections 120 and the means mounted thereon are also pivotal about the juncture of flange 118 and plate 114 to permit the limited movement of the pressure members which, as previously described, assures their proper positioning within the bite of the pressure-applying rolls.

The mounting means comprising support member 113 and cover member 142 are pivotally mounted for movement as a unit on pin 138 with respect to chassis 130 between the operative position shown in FIG. 3 and an inoperative position shown by broken lines in FIG. 5. Support member 113 and cover member 142 are retained for movement together as a unit by edge section 152 of flange 150 which allows only limited pivotal movement of either plate 114 or first sections 120 with respect to cover member 142. Means are provided for urging the mounting means comprising support members 113 and cover member 142 into operative position and in the form shown comprise a pair of coiled tension springs 158 secured at their ends to lugs 160 formed by piercing cover plate 144 adjacent the edge of the cover plate opposite flange 150 and a pair of ears 162 turned up from the ends of base plate 132 at the side thereof opposite slots 136. Springs 158 are disposed, in the operative position of the mounting means, between flanges 134 of base plate 132 and flanges 146 of cover member 142. Pin 138 and the various elements mounted thereon are retained against axial movement by conventional C-rings 164 engaged in circumferential grooves in pin 138. Pin 138 is biased toward the pressure-applying rolls by springs 158, and is movable within slots 136 against the bias of springs 158 away from rolls 68 and 70 to permit withdrawal of members 90 and 106 from the bite of the pressure rolls and thereby permit pivotal movement of the members from the operative position shown and described. This is important to provide access to the rolls, for example, to allow for cleaning of the rolls. When the film assemblage is loaded into the camera, the entire mounting means including support member 113, base plate 132 and cover member 142 extend within the container of the assemblage through opening 52 therein.

The novel mounting of the members which restrain the second sheet against movement and apply pressure to the sheets to prevent escape of the processing liquid at the edges of the sheets, permits limited movement of the pressure members in two mutually perpendicular planes both perpendicular to the plane of movement of the sheets between the members and the pressure-applying rolls. This is important to insure proper positioning of the pressure members with respect to the sheets and the rolls at all times without interfering with the withdrawal movement of the sheets from the camera. The mounting of the members is also such as to permit their displacement from adjacent the rolls to a position remote from the rolls to provide access to the rolls.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus including a pair of juxtaposed members providing a passage therebetween through which a pair of photographic sheets are moved in superposition for distributing a processing liquid between said sheets, means for preventing the escape of said liquid from between said sheets at the lateral edges thereof during movement of said sheets through said passage and distribution of said liquid between said sheets, said means comprising, in combination:

means providing first and second pairs of sheet engagement elements;

support means for mounting said elements of said first pair in position to engage the lateral margins of one of said sheets closely adjacent said members at the entrance to said passage;

said support means including spring means mounting said elements of said second pair in juxtaposition with said elements of said first pair in position to engage the lateral margins of the other of said sheets;

said spring means biasing said elements of said second pair toward said elements of said first pair to apply compressive pressure to said lateral margins of said sheets; and means mounting said support means for movement transversely of the direction of movement of said sheets between said members;

said support means including guide means for engaging the lateral edges of said sheets for locating said elements in engagement with said lateral margins of said sheets.

2. Photographic apparatus as defined in claim 1 in which said means mounting said support means permit the movement of said support means in two substantially perpendicular directions.

3. Photographic apparatus as defined in claim 1 in which said means mounting said support member comprises a deformable resilient member for locating the two pairs of juxtaposed sheet engagement elements substantially equidistant from the center of the path of movement of said sheets between said juxtaposed members.

4. Photographic apparatus as defined in claim 1 in which juxtaposed sheet engagement elements have opposed sheet engagement surfaces with convergent portions for guiding said sheets between said juxtaposed elements and substantially parallel portions for applying compressive pressure to said sheets.

5. Photographic apparatus as defined in claim 1 in which said passage between said juxtaposed members is defined by walls converging toward one another, and said elements extend in the direction of movement of said sheets into said passage between convergent portions of said walls.

6. Photographic apparatus as defined in claim 1 in which said support means are movable between an operative position in which said elements are disposed closely adjacent said members and an inoperative position in which elements are displaced from the vicinity of said members, and resilient means are provided for retaining said support means into said operative position.

7. Photographic apparatus as defined in claim 1 in which said elements of said first pair comprise end portions of an engagement member mounted on said support means, said support means include deformable resilient sections, and said elements of said second pair comprise means mounted on said deformable resilient sections.

8. Photographic apparatus as defined in claim 7 in which said elements of said second pair comprise dependent elements mounted on said deformable resilient sections of said support means in juxtaposition with said end portions of said engagement member.

9. Photographic apparatus as defined in claim 1 in which said support means comprise a unitary element including a first section mounting said first pair of elements and two resilient sections in the form of cantilever springs mounting said second pair of elements and biasing said second elements of said second pair toward said elements of said first pair.

10. Photographic apparatus as defined in claim 1 in which said means for mounting said support means include a unitary spring member having resilient portions pivotally deformable about two mutually perpendicular axes both of which are substantially perpendicular to the direction of movement of said sheets between said juxtaposed members.

11. Photographic apparatus as defined in claim 1 in which said means for mounting said support means includes a pivot having an axis located adjacent the path of movement of said sheets and extending transversely of said path, said support means is mounted on said pivot for pivotal movement between an operative position in which said elements are disposed closely adjacent said members and an inoperative position in which said elements are displaced from said members, said pivot is movable toward and away from said members, and resilient means are provided for urging said pivot toward said members and retaining said mounting means in said operative position.

12. Photographic apparatus comprising, in combination:

a pair of juxtaposed members for applying compressive pressure to a pair of superposed sheets over portions thereof extending substantially from side to side of said sheets to distribute a liquid in a layer between said sheets during movement of said sheets relative to and between said members; and means including pressure elements for engaging said sheets adjacent said members and applying compressive pressure to only the lateral margins of said sheets for preventing the escape of said liquid from between said sheets at the lateral edges thereof;

said means being mounted for movement relative to said members transversely of the direction of movement of said sheets;

said means including guide means for engaging the lateral edges of said sheets and locating said pressure elements in engagement with said lateral margins of said sheets.

13. Photographic apparatus as defined in claim 12 in which said juxtaposed members engage and apply compressive pressure to said sheets substantially along a line perpendicular to the direction of movement of said sheets between said members, and said pressure elements engage and apply compressive pressure to said lateral margins of said sheets at locations closely adjacent said line.

14. Photographic apparatus as defined in claim 12 in which said juxtaposed members engage and apply compressive pressure to said sheets substantially along a line perpendicular to the direction of movement of said sheets between said members, and said means are mounted for movement relative to said members in a direction parallel with said line.

15. Photographic apparatus as defined in claim 12 in which said means comprise two pairs of juxtaposed pressure elements, said elements of each of said pairs being biased toward one another and having opposed surfaces including convergent portions for guiding said sheets between said elements and substantially parallel portions for applying compressive pressure to said sheets.

No references cited.